United States Patent [19]

Cantrell

[11] 3,972,744

[45] Aug. 3, 1976

[54] METHOD OF AND MEANS FOR MAKING LIGHTWEIGHT, LOW COST IMPACT RESISTANT BUMPERS

[75] Inventor: Ronald G. Cantrell, Huntington, W. Va.

[73] Assignee: Houdaille Industries, Inc., Buffalo, N.Y.

[22] Filed: July 15, 1975

[21] Appl. No.: 596,175

Related U.S. Application Data

[63] Continuation-in-part of Ser. No. 441,064, Feb. 11, 1974, Pat. No. 3,905,630.

[52] U.S. Cl. ............................ 148/12.4; 148/131; 148/145; 266/115; 266/119; 266/249
[51] Int. Cl.² ...................... C21D 7/00; C21D 9/00
[58] Field of Search ................ 148/12.4, 12 F, 145, 148/131; 266/4 R, 5 C, 6 PC; 293/70, 98

[56] References Cited
UNITED STATES PATENTS

| | | | |
|---|---|---|---|
| 2,022,532 | 11/1935 | Beans | 266/6 PC |
| 2,762,734 | 9/1956 | Corral | 266/6 PC |
| 3,589,697 | 6/1971 | Hays et al. | 266/6 PC |

*Primary Examiner*—W. Stallard
*Attorney, Agent, or Firm*—Hill, Gross, Van Santen, Steadman, Chiara & Simpson

[57] ABSTRACT

Bumper bars are shaped from easily workable relatively thin gauge sheet or strip steel into bumper bar shell profile provided with a horizontally elongated body portion and spaced apart integral upper and lower flanges of substantial width extending freely angularly from the body portion, and opposite end portions turned angularly away from the body portion in the same direction as the flanges. The body portion and the flanges are heat and quench hardened throughout their major extent, thereby providing the bar with a beam strength and yield strength to withstand bending stresses from repeated impact forces of a high order of magnitude without significant damage, and the opposite end portions are maintained free from heat and quench hardening as warpage control areas and thereby maintaining the bumper bar free from detrimental warpage.

Apparatus for carrying out the method is provided.

29 Claims, 11 Drawing Figures

METHOD OF AND MEANS FOR MAKING LIGHTWEIGHT, LOW COST IMPACT RESISTANT BUMPERS

This application is a continuation-in-part of my copending application Ser. No. 441,064, filed Feb. 11, 1974 and now U.S. Pat. No. 3,905,630.

This invention is concerned with bumper bars for automotive vehicles, and is more particularly concerned with making impact resistant, lightweight, low cost, bumper bars shaped from easily workable steel.

Although numerous and varied structures, devices and arrangements have been proposed to protect automotive vehicle bumpers against damage from at least minor collisions to which such bumpers are subjected in the operation of an associated vehicle, there is a continuous struggle to reduce costs and dead weight in respect to the bumper installations. These criteria have become especially pertinent because in order to meet insurance industry and Government guide lines and standards, additional impact cushioning, snubbing, absorbing, reinforcement structures have been incorporated in and associated with the bumper bars. Such expedients have not only added parts to the associated vehicles but have increased costs and have added dead weight to the ends of the vehicles, thereby often requiring larger tires, stronger suspensions, heavier frames, heavier brakes, and the like.

A special problem has existed in the construction and styling of bumpers to provide efficient means to transmit impact energy to the energy absorbing devices attached to the vehicle body. To attain adequate beam strength in prior bumpers it has generally been necessary to provide reinforcement, often in the form of added heavy bar structure, or the section mass has been substantially increased, even for smaller so-called compact vehicles.

One proposed expedient has consisted in making the bumper face bars from extruded aluminum sections. Immediately a cost differential arises because the aluminum material cost is over four times as great per pound as steel sheet suitable for the purpose, and a severe handicap on efficient use of material exists because of requirement for constant cross section in such an extrusion. This is wasteful of material because a constant cross section is not actually necessary to attain adequate impact resistance. Aluminum does, of course, have an advantageous weight saving factor as compared to a cold formed mild sheet or strip steel section of roughly equivalent impact resistance or yield strength such as S.A.E. 1008 heretofore commonly used for bumper face bars.

It is, accordingly, an important object of the present invention to provide a new and improved method of and means for making bumper bars from sheet or strip steel to meet extremely high standards of impact resistance and which will be possessed of a weight factor competitive with equivalent extruded aluminum bumpers, but at much lower cost.

Another object of the invention is to provide a new and improved method of and apparatus for making automobile bumper bars from sheet steel and which bars will meet extremely high standards of impact resistance without requiring the added weight and cost of reinforcement of the face bar as heretofore necessary with prevailing materials and designs.

A further object of the invention is to provide a new and improved method of and means for making automotive vehicle bumper bars from rolled sheet or strip steel and possessed of unusual beam strength and yield strength.

A still further object of the invention is to provide new and improved method of and means for making steel bumper bars which can be economically formed according to preferred shaping practice and in which the area most susceptible to impact force damage is hardened to a satisfactory high yield strength and free from detrimental warpage.

Still another object of the invention is to provide a new and improved method of and means for making steel bumper bars by selectively heat treating areas to provide unusual yield strength where the bumper bars are most vulnerable to impact damage, and to provide desirable resilience to resist permanent deformation, and yet maintain the bumper bars free from detrimental damage even though in the heat treatment annealing is omitted.

Other objects, features and advantges of the invention will be readily apparent from the following description of preferred embodiments thereof, taken in conjunction with the accompanying drawings, although variations and modifications may be effected without departing from the spirit and scope of the novel concept embodied in the disclosure, and in which:

Figure 1:
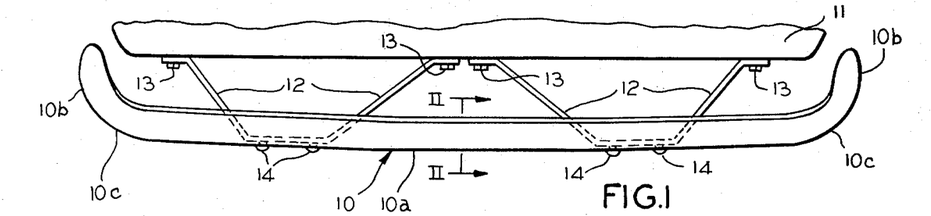
FIG. 1 is a schematic illustration showing an automotive vehicle bumper embodying features of the invention.
Figure 2:
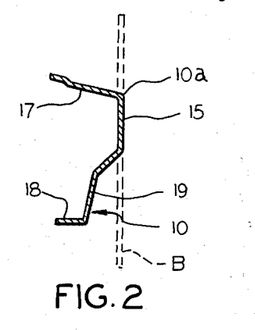
FIG. 2 is a schematic sectional view taken substantially along the line II—II of FIG. 1.

Having reference to FIGS. 1 and 2, a representative automotive vehicle bumper face bar 10 formed from rolled sheet or strip steel is of a length to extend across the front or rear end of an automotive vehicle 11 and is supported outboard therefrom by any preferred bumper supporting means such as bars 12 extending therefrom and suitably secured as by means of bolts 13 to the vehicle and as by means of bolts 14 to the inner face of the face bar. These support bars 12 may be of the buckling column bar type covered in U.S. Pat. No. 3,702,202 providing an energy storing and absorbing and self-recoverable bumper support system capable of yielding resiliently on imposition of impacts against the bumper at a velocity of on the order of 5 miles per hour without damage to the bumper assembly or to the vehicle in a short displacement travel distance toward the vehicle of on the order of 1½ to 2½ inches. Any other preferred bumper support system which will comply with insurance industry or Government standards may be employed.

A principal aim of the present invention is to provide adequate beam strength and yield strength in an automotive vehicle bumper bar to withstand impacts specified according to United States Department of Transportation Federal Motor Vehicle Safety Standard No. 215, without requiring any reinforcement even though the bumper bar is formed from rolled sheet steel of relatively thin gauge for lightweight and low cost. According to the present invention this aim is attained both in bumper face bars in the area which is most susceptible to impact damage and permanent set, while leaving areas of the bar which are not liable or at least minimally liable to impact relatively unhardened and serving as stabilizing, warpage minimizing areas for the bar. All-over furnace hardening of the bumper bar is not satisfactory and is not currently practiced because rolled sheet material from which the bumper bars are made distorts badly during furnace heating and subsequent quenching and requires annealing and straightening to relieve distortions. Furnace hardening is a time-consuming process which requires elaborate equipment, especially for objects as large as automobile bumper bars.

By way of example, where the bumper face bar 10 comprises an elongated body 10a and opposite end portions 10b of the currently popular inboardly extending wraparound shape and spaced apart by the intervening body portion 10a, the body portion 10a is heat and quench hardened and the opposite end portions 10b remain substantially unhardened and aid in controlling distortion and alleviate need for annealing, stress relief or straightening after hardening.

In designing the bumper bar 10 for beam strength, the bumper bar body 10a is shaped to provide a generally U- or C-shaped shell profile including an outboardly facing and projecting face area 15 along its length and from which extend generally freely inboardly a top flange 17 merging with the upper side of the face 15, and a lower generally inboardly extending flange 18 joined to the lower side of the face 15 by means of a generally downwardly extending angular inset flange portion 19. The most economical shape for the bumper bar 10 will be determined in view of various parameters including the weight of the vehicle to which the bumper is to be applied, the distance to which the bumper may be safely displaced by impact toward the vehicle, the distance between the bumper supports, the speed of impact to be accommodated, and the material from which the bar is to be made. In the manufacture of the bumper face bar 10, the profile may be formed up in any preferred manner from suitable sheet steel provided in a strip blank B, represented in FIG. 2, i.e. rolled or die stamped, or both, to provide the designed profile configuration.

In heat and quench hardening the body portion 10a, which includes the flanges 17 and 18 it may be hardened all over including the face area 15, the flanges 17 and 18 and the flange portion 19, but may be only selectively hardened, as for example by hardening only the area of the face 15 and a portion at least of either or both of the flanges 17 and 18, while leaving a longitudinal area between the free marginal portion of the flange 17 and the face 15 unhardened and also leaving the longitudinal area of the intermediate portion 19 unhardened. This aids and serves as a stabilizing control in avoiding distortion of the hardened areas of the bar. Inasmuch as the inboardly extending end portions 10b of the bar are rarely impacted head-on, they can be left unhardened with respect to heat and quench treatment to aid in controlling distortion. However, heat and quench hardening is desirably effected in respect to shoulder areas 10c between the body 10a and the end portions 10b so that angling impacts toward the ends of the body portion 10a will be adequately resisted.

Figure 3:
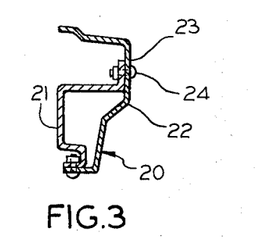
FIG. 3 is a sectional view similar to FIG. 2 but showing a modification.

Where, for any reason, it may be deemed desirable to provide greater impact resistance for the impact face of the bumper than can be attained by selective hardening of a fairly thin shell bumper face bar, as already described, such as where the bumper is intended for heavier vehicles or at least vehicles that in expected usage must be provided with bumpers of greater impact resistance than for ordinary lighter weight or compact passenger automobiles, a structure according to FIG. 3 may be provided. Therein a bumper bar assembly 20 comprises a bumper reinforcement type of bar 21 supporting a face bar shell 22 providing primarily a cosmetic effect while primary impact resistance is provided by the bar 21. Where, as shown, the face bar 22 is of generaly U- of C-shape profile, the bumper reinforcement bar 21 may be of generally complementary reverse shape such as the generally U-shape profile shown with one flange leg secured within the impact-prone face portion 23 of the bar 22 in any preferred manner, such as by means of rivets or screws 24. Another flange leg of the bar 21 is secured to the lower flange of the face bar profile in similar manner. The bumper bar 21 will be heat and quench hardened selectively similarly as described for the bumper face bar 10. The bumper face bar 22 may or may not be selectively heat and quench hardened, whichever may be preferred.

The steel stock material, whether in sheet or strip form, for production of the bumper face bar 10 or the reinforcement bar 21, should be selected from a grade that has the proper cold forming and heat hardening characteristics. It will be appreciated, of course, that the lower the carbon content of the material, the easier will be the cold forming thereof. On the other hand, the higher the carbon content, the greater the hardening characteristics. A good carbon content for the present purpose is within a range of from 0.12 to 0.17 percent, with 0.14 percent being the ideal. Proper proportions of manganese, molybdenum and rare earths for cleanliness and fine grain should also be provided so as to attain good thermal transformation characteristics. The material should have an elongation characteristic of about 8 percent after hardening. Such steel sheet or strip must be capable of being formed in the as-rolled condition, must be responsive to fast heating cycle, must have the ability to quench to a martensitic and/or bainitic structure, and be of a lean grade.

During a heating cycle for hardening the bumper bar 10 or 21, the heating should be accomplished in about 15 seconds to a selective heat in the range of 1650° to 1700°F. for a material on the order of 0.08 to 0.130 inch gauge. Then, the transition from heating to quenching should be effected within about 0.2 to 0.3 second, followed by immediate quenching which may be at about 70°F. The quenching fluid such as water may be applied for on the order of 9 seconds.

Selective hardening of the bumper bar 10 or 21 is most efficiently and inexpensively effected by heat treatment of the selected areas of the bar and quenching. Although the heating may be done by resistance heating or flame heating, induction heating provides certain advantages in minimizing necessary apparatus and improved efficiency. In an event, the method involves first forming the sheet metal blank into the desired profile by rolling or drawing techniques or a combination of such techniques. If the profile is relatively severe or deep formed, the formed piece may be stress relieved at a suitable less than hardening temperature. Then the area or areas to be selectively hardened will be heated to hardening temperature and the piece then quenched. The piece may remain fixtured throughout the heating and quenching cycles, although quenching may be effected in a tank or otherwise without fixturing the selectively hardened bar.

Figure 4:
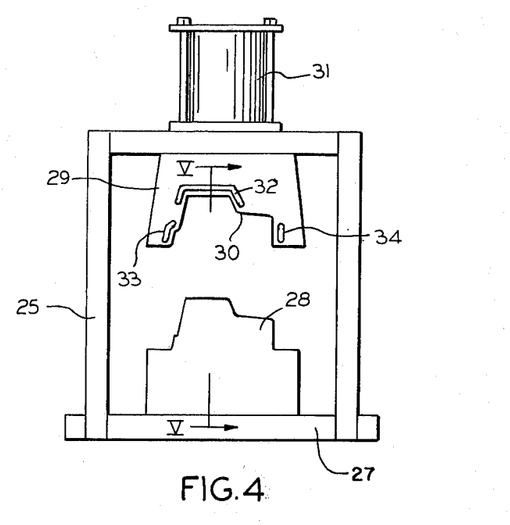
FIG. 4 is a schematic illustration of apparatus embodying features of the invention and adapted to practice the method of the present invention for selectively hardening formed steel bumper bars.
Figure 5:
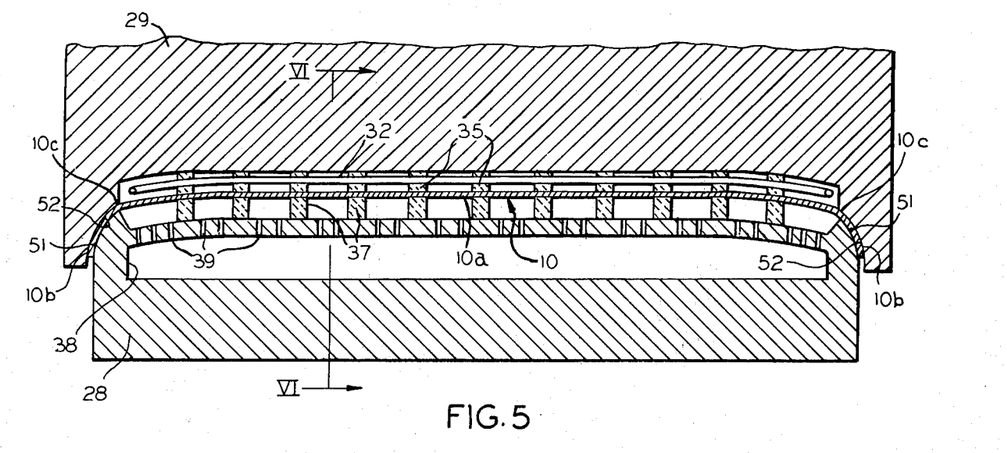
FIG. 5 is a longitudinal sectional view taken by way of reference, along the line V—V of FIG. 4 but showing the dies closed in an operating cycle.
Figure 6:
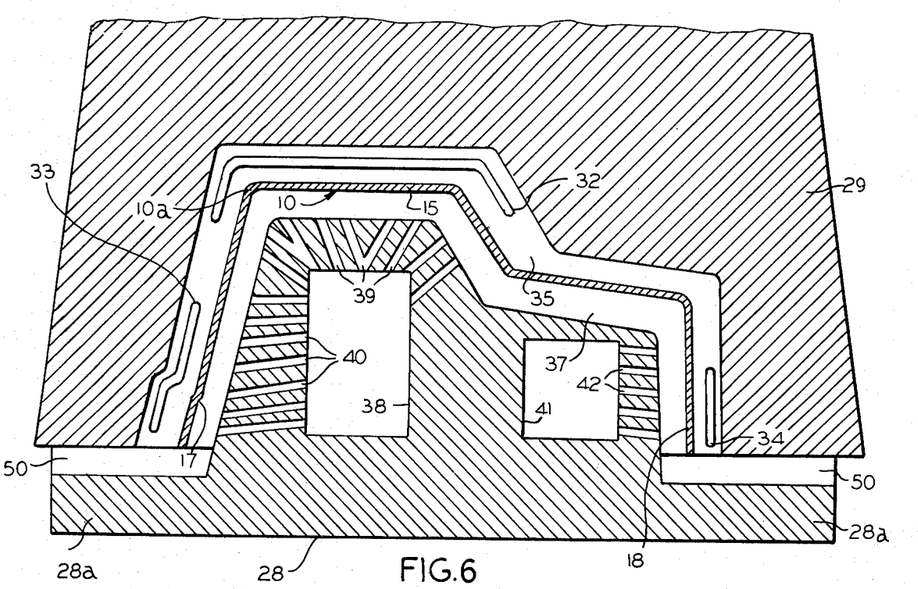
FIG. 6 is an enlarged fragmentary sectional detail view taken substantially along the line VI—VI of FIG. 5.

One form of apparatus as schematicaly illustrated in FIGS. 4, 5 and 6 provided for the special purpose of induction heat treating the bumper face bars 10 or the reinforcing bumper bars 21, in production, comprises a suitable supporting frame 25 over and about a bed 27 on which is mounted a stationary male quenching and fixturing die 28 dimensioned to be received within the shell cavity of the bumper bar 10 or 21. Supported by the upper portion of the frame 25 is a female heating and fixturing die 29 which is provided with a cavity 30 conforming to the finished outer face of the bumper face bar 10 or to the shape of the reinforcing bumper bar 21, as the case may be. In this instance the dies 28 and 29, and more particularly the cavity 30 and complementary male die formation of the die 28 are shown as having contour profiles complementary to the bumper face bar 10. Means such as a fluid operated actuator 31, comprising a piston and cylinder device, are provided for raising and lowering the upper die 29 relative to the lower die 28, although if preferred similar or other means may be provided for raising the lower die 28 into fixturing relation to the upper die 29.

Induction heating means are carried by one of the die halves, herein shown as the upper die 29, for applying hardening heat to selective areas of the bumper face bar 10. An induction heating coil 32 is provided for heating the face area 15 of the bumper face bar, while respective induction heating coil heaters 33 and 34 are provided for heating the flange areas 17 and 18. These induction heating coils 32, 33 and 34 are mounted in the die 29 in a manner to enable hardening heating throughout the entire length of the body 10a and the shoulders 10c of the bumper face bar 10.

Mounting of the inductors 32, 33 and 34 is such that the bumper bar can be fixtured during heating and quenching cycles. For this purpose, the inductors are mounted in an electrically insulated relation relative to the supporting die member 29 and in close but insulated relation to the bumper bar to be treated. Suitable means for this purpose comprise molded refractory riser vanes 35 (FIGS. 5 and 6) cast on and about the inductors at longitudinally spaced intervals and having edges conforming to and secured to the surfaces defining the die cavity and having bumper bar engaging edges conforming to the bumper bar sectional profile. Complementary to and matching the risers 35 are similar refractory risers 37 mounted on the male die 28 and engageable with the inside shell surfaces defining the bumper bar profile. The refractory, insulating risers are desirably constructed from a low conductivity material, such as thoria ($ThO_2$) and which may be characterized by on the order of 0.0 to 0.5 BTU/hr./sq. ft./°F./ft. with a coefficient of thermal expansion on the order of 30 to $50 \times 10^{-7}$ per °F. and a maximum working temperature of at least 4000°F. Not only do the risers 35 and 37 serve as supports and locators for the inductors 32, 33 and 34, and as thermal and electrical insulators, but they also serve as fixturing or holding surfaces for the engaged portions of the bumper bar securely limiting movement thereof and thus preventing warpage distortion of the bumper bar not only during heating but also during quenching.

Immediately after hardening heat temperature has been attained in the bumper bar, the inductors are turned off and the bumper bar is rapidly quenched. This is desirably effected by subjecting the heated bar to quenching liquid such as water. To facilitate such quenching, the lower die 28 is provided with a header passage 38 having sets of quenching liquid ports 39 directed toward the inner surface of the impact area 15 of the bar and immediately adjacent areas and a set of quenching liquid ports 40 directed toward the flange 17. From another header passage 41 a set of quenching liquid ports 42 direct toward the flange 18. In order to permit drainage and circulation of the quenching liquid, drainage grooves 50 are provided in lateral base flanges 28a on the die member 28, there being as many of such grooves as desired, but at least one such groove being in alignment with each of the groove-like spaces between the risers 37, and between the risers 37 at the opposite ends of the die assembly and the die members.

While the body portion 10a of the bumper bar 10 is engaged by and between the riser vanes 35 and 37, for heating and quenching of the body portion 10a and the shoulders 10c, the end portions 10b are engaged by and between complementarily contoured clamping surfaces 51 and 52 on respectively the die member 28 and the die member 29. Clamping grip of the end portions 10b serves to hold the bar 10 positively against warpage during the heating and quenching cycles. By thus clamping and gripping the end portions 10b between surfaces of the die members 28 and 29 themselves, which are of substantially harder material, such as metal, then the riser vanes 35 and 37, the riser vanes are relieved of necessity for any more than minimal gripping pressure of the body portion 10a therebetween.

Figure 7:
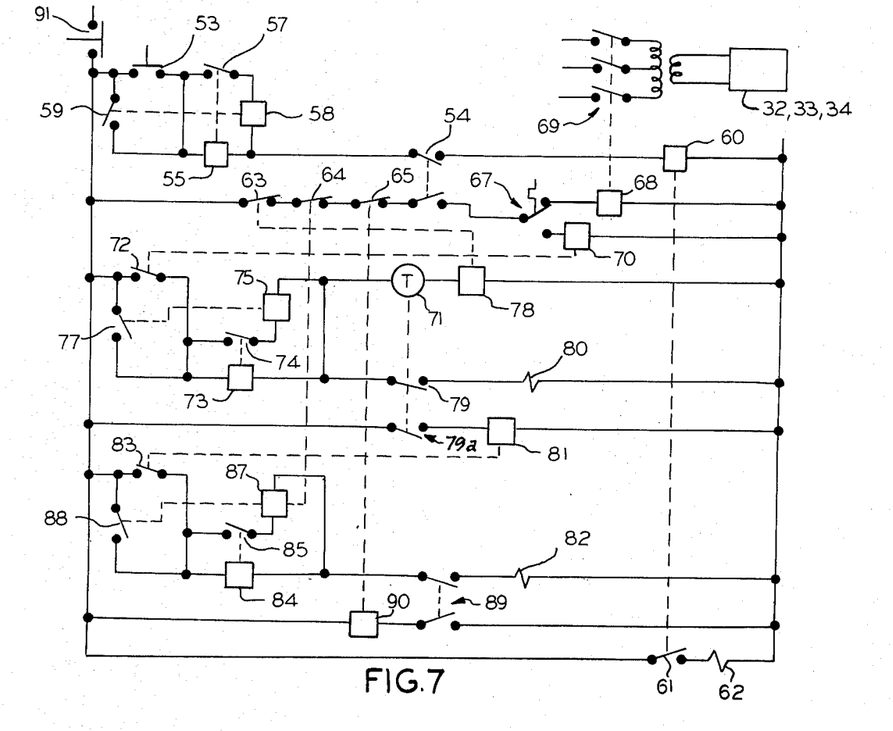
FIG. 7 is an electrical operating circuit schematic.
Figures 8, 9:
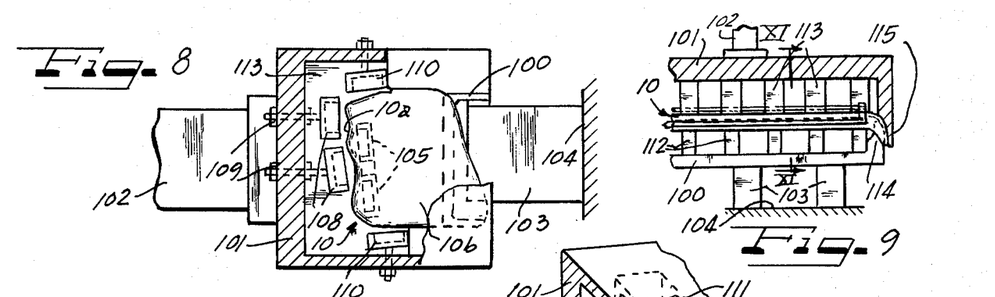
FIG. 8 is a schematic end elevational view of modified apparatus for practicing the method of the present invention.
FIG. 9 is a fragmentary top plan view of the apparatus of FIG. 8.
Figure 10:
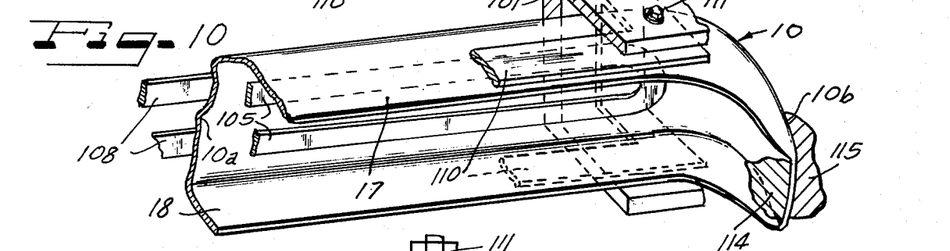
FIG. 10 is a fragmentary schematic isometric view of the apparatus and a bumper bar undergoing treatment.
Figure 11:
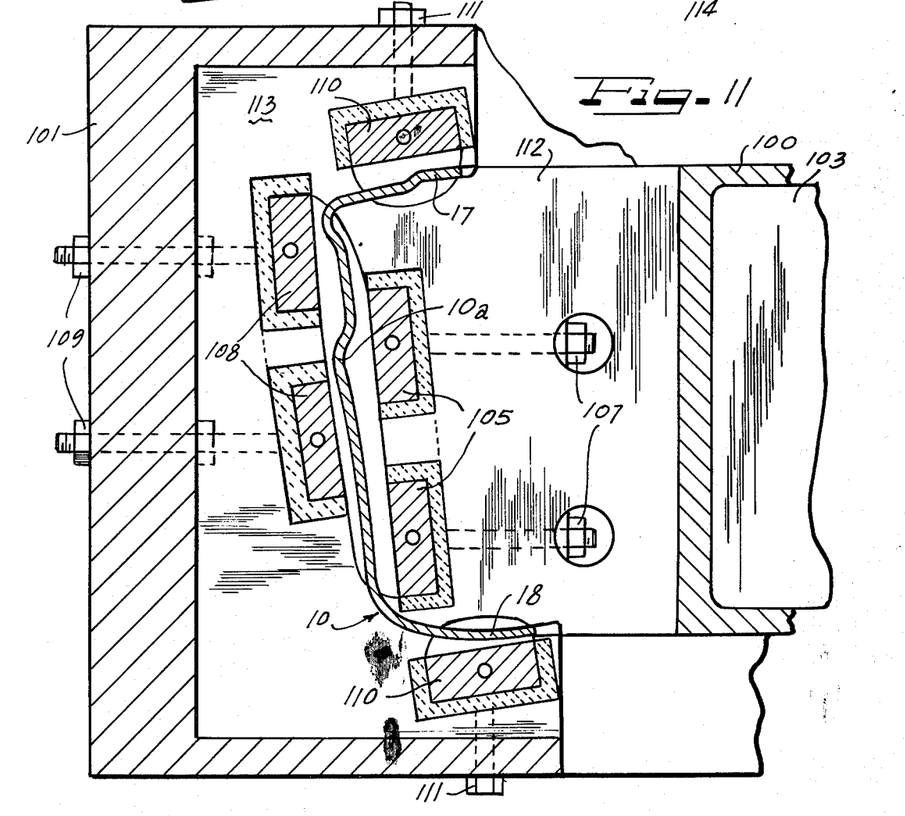
FIG. 11 is an enlarged fragmentary sectional detail view taken substantially along the line XI—XI of FIG. 9.

In a full cycle of operation, starting with the dies 28 and 29 separated as shown in FIG. 4, the bumper bar to be treated is placed in the die assembly by laying it on the lower die member 28. Then the operating cycle is started by momentarily closing a normally open starting switch 53 in a suitable electrical control circuit such as exemplified in FIG. 7. This completes a circuit through a limit switch 54 and effects energizing of a relay 55 to close a normally open contact 57 for energizing a holding relay 58 to close a normally open contact 59. At the same time a die closing relay 60 is energized to close a contact 61 in a circuit to energize a die closing solenoid in control of a fluid circuit (not shown) for the actuator cylinder 31 to effect lowering of the die 29 into closing relation to the die 28. As the die closes the limit switch 54 shifts to de-energize the holding relay 58 and the die closing relay 60 and to complete a circuit through normally closed contacts 63, 64 and 65 and a temperature switch 67 to activate a relay 68 for closing normally open contacts 69 in control of energizing circuit for the inductor coils 32, 33 and 34, to begin the heating cycle. When a predetermined temperature is reached, such as about 1650°F., the temperature switch 67 opens the circuit through the relay 68 and closes a circuit through a relay 70 which closes a circuit for a timer 71 by closing a normally open contact 72 and energizing a relay 73 which closes a normally open contact 74 to energize a holding relay 75 which closes a normally open contact 77. Closing of the timer circuit also energizes a relay 78 which opens the normally closed contact 63 which cuts out the heating coils while the timer 71 is operating. Activation of the timer 71 causes it to close a normally open switch 79 which actuates a solenoid 80 for opening a quenching fluid supply for the several quenching headers in the die 28. After a predetermined time interval such as on the order of nine seconds, the timer closes normally open switch 79a which energizes relay 81 for completing a circuit through and activating a solenoid 82 for reversing the die actuator cylinder 31 to open the dies. Immediately after activating the relay 81, such as within one second, the timer opens the switches 79 and 79a. Activation of the relay 81 closes a normally open contact 83 which momentarily closes the circuit through the solenoid 82 and activates a relay 84 to close a normally open contact 85 for energizing a relay 87 which closes a normally open holding circuit contact 88 and also acts to open the normally closed switch 64. The die opening solenoid 82 operates until the die 29 returns to fully open position, at which time a limit switch 89 reverses to open the energizing circuit for the solenoid 82 and to close a circuit through a relay 90 which opens the normally closed switch 65. The limit switch 54 reverses, and the operating circuits all return to the non-operating condition thereof until the start switch 53 is again closed. Any time during the automatic cycle initiated by the switch 53, the automatic sequence can be stopped by opening a normally closed stop switch 91.

Having reference to FIGS. 8–11, apparatus is depicted for heating the selected areas of the bumper bar 10 by induction heating but in a somewhat simpler arrangement and enabling speeding up production by elimination of quenching in the fixture. Accordingly, this apparatus comprises a stationary male fixturing die 100 dimensioned to be received within the shell cavity of the bumper bar 10 and a female fixturing die 101 suitably cavitated to receive the face of the body 10a and turned upper and lower flanges 17 and 18 as well as the turned wrap-around end portions 10b. In this instance the dies 100 and 101 are mounted to operate in a horizontal orientation, that is they face horizontally toward one another instead of facing vertically toward one another as in the arrangement of FIGS. 4–6. Mounting of the die member 101 is on suitable means for reciprocating movement into and out of operating coaction with the die 100, as by having the die 101 mounted on suitable powered ram or actuator structure 102 which may, if preferred, involve one or more actuators such as the actuator 31 in FIG. 4. On the other hand, the stationary die 100 is supported as by means of fixed supports 103 on stationary supporting structure such as a frame or other structure as depicted at 104. This arrangement permits easy loading of successive ones of the preformed bumper bars 10 into the separated dies either from above or below or in an endwise delivery arrangement, without overhead, underhand or end obstruction to access into the dies, depending upon any preferred assembly line facilities that may be provided for this purpose.

Induction heating means are carried by both of the guides 100 and 101 so oriented that hardening heat will be applied along the entire length of the bar body 10a and the inboardly freely extending upper and lower flanges 17 and 18, but leaving the wraparound inboardly turned end portions 10b of the bar free from hardening heat. For this purpose, the stationary guide 100 carries a horizontally extending hairpin coil 105 secured in place as by means of bolts 107 and positioned to heat vertically spaced longitudinal areas of the bar body 10a in cooperative and overlapping relation to induction heating effected by hairpin coil 108 mounted as by means of bolts 109 on the die 101 and extending along the bar body 10a in staggered relation to and complementary to the legs of the hairpin inductor 105 so that the entire bar body will be brought to hardening temperature by operation of the inductors 105 and 108. For selectively heating the flanges 17 and 18, a generally hairpin inductor 110 secured in position on the die 101 by means of bolts 111 has its legs located to heat the inboard portions of the flanges 17 and 18, leaving substantial width portions along juncture of the flanges with the body 10a free from hardening heat as warpage control, stabilizing areas running into and connected with the turned end portions 10b which are also free from hardening heat and thus provide stabilizing warpage control areas. Thereby, what in effect is provided is a matrix of the sheet metal of the bumper bar 10 which remains free from hardening heat and in stabilizing control of the body portion and the heated portions of the upper and lower flanges which are separated from one another by the unheated and therefore unhardened matrix areas of the bumper bar.

During the heating cycle, the dies 100 and 101 maintain the bumper bar 10 fixtured and for this purpose are provided with inductor positioning molded refractory transite blocks 112 on the die 100 and corresponding complementary transite blocks 113 on the die 101 and which may serve to a minimal extent as bumper bar supports along the areas which are not to be heated to hardening heat. At the opposite ends of the die assembly, the die 100 has clamping portions 114 engaging inside surfaces of the bar end portions 10b and the die 101 has complementary clamping portions 115 which cooperate with the clamping portions 114 to clamp the end portions 10b in heat sink supported position during operation of the inductors to selectively heat the desired areas of the bumper bar to hardening heat.

Operation of the inductors 105 and 108 is preferably effected in a pulsed manner for efficient heating of the body or face portion of the bumper bar but the flange heating inductor coil may run continuously during the heating operation. In general, similar electrical control circuitry as exemplified in FIG. 7 may be employed in the operation of the inductors 105, 108 and 110, except that those portions of the circuit in FIG. 7 involved with quenching will be omitted, because after heating of the selective areas of the bumper bar has been completed, the bumper bar is released by opening of the dies 100 and 101 and removal of the selectively hardening heated bumper bar is effected. The bumper bar thus released from the die assembly is promptly quenched as by transferring it into a quenching tank whereby to complete the hardening. Because of the stabilizing warpage control unhardened matrix areas of the bumper bar detrimental warpage of the bumper bar is avoided so that annealing subsequent to hardening of the bumper bar is unnecessary.

Although only one representative heat treating unit of each form of the apparatus has been shown, it will be understood that a plurality of such units may be mounted in relation to feed and take-away conveyor systems, rotary indexing stations, and the like. The method and apparatus are well adapted, as is evident, to high speed producton line mass manufacturing facilities.

A bumper produced according to the present invention will have adequate beam strength and yield strength because the hardened area or areas will be within a range of a minimum yield of 120,000 psi and the profile section required will be based on that minimum yield strength. Therefore the bumper face bar 10 can be used without reinforcement between it and the bumper supports. Even where a reinforced bumper face bar is necessary, weight of the bumper system is reduced because the mass of the material can be reduced by using a lighter gauge material or a smaller section or both. A bumper of the equivalent impact resistance with conventionally used steel materials would have to be approximately four times the mass of material usable according to the present invention with selective hardening. The considerable weight reduction in a bumper system as thus provided is readily evident.

A bright finish can be applied to bumpers which are produced according to the present invention. Impact and ding resistance is provided in the area of the bumper most liable to damage. By constructing the upper flange 17 of the bumper bar 10 of substantial inboard length, need for a sight shield can be eliminated.

Bumpers made according to the present invention comply with present minimum insurance and government standards requiring resistance to damage from impacts of up to 5 miles per hour of the vehicle against a stationary object. Such standards are customarily tested by swinging a pendulum to impact the bumper mounted on a stationary vehicle and simulating driving hazards.

It will be understood that variations and modifications may be effected without departing from the spirit and scope of the novel concepts of this invention.

I claim as my invention:

1. A method of making a bumper bar of a length to be mounted protectively horizontally across an end of an automotive vehicle, comprising:
    shaping a suitable length of easily workable relatively thin gauge sheet or strip steel into bumper bar shell profile provided with a horizontaly elongated body portion and spaced apart integral upper and lower flanges of substantial width extending freely angularly from the body portion, and opposite end portions turned angularly away from the body portion in the same direction as said flanges;
    heat and quench hardening said body portion and said flanges throughout their major extent and thereby providing the bar with a beam strength and yield strength to withstand bending stresses from repeated impact forces of a high order of magnitude without significant damage; and
    maintaining said opposite end portions free from heat and quench hardening as warpage control areas and thereby maintaining the bumper bar free from detrimental warpage.

2. A method according to claim 1, including providing said body portion with an intermediate portion along and between one of said flanges and said body portion, and leaving said intermediate portion as well as said opposite end portions substantially free from heat and quench hardening.

3. A method according to claim 1, including effecting heat and quench hardening along parts of the flanges spaced from the body portion while leaving limited areas of the material of the bar between the body portion and the hardened parts of the flanges substantially free from heat and quench hardening.

4. A method according to claim 1, including mounting on the bumper means for mounting the bumper across the end of an automotive vehicle and comprising securing fixedly directly to the inner surface of the body portion members which extend from the inner surface of the body portion between said flanges and said opposite end portions.

5. A method according to claim 1, comprising shaping said bumper bar from steel having carbon content in a range of 0.12 to 0.17 percent, and providing the hardened areas with an 8 percent elongation factor and a yield strength of about 120,000 psi.

6. A method according to claim 1, comprising induction heating those portions of the bar to be hardened, and then quenching the heated portions while maintaining the bar fixtured.

7. A method according to claim 1, comprising induction heating those portions of the bar to be hardened while maintaining the bar fixtured, releasing the heated bar, and quenching the heated bar.

8. A method according to claim 1, comprising induction heating the body portion from both front and back sides thereof, induction heating said flanges, and after the induction heating quenching the heated portions of the bar.

9. A method according to claim 1, including shaping said end portions to extend inboardly relative to the body and providing shoulders on the bar joining said body and said end portions, and heat and quench hardening said shoulders.

10. A method according to claim 1, comprising shaping said bumper bar to provide a bumper reinforcement, and mounting a decorative bumper shell on and in concealing relation to said bumper bar.

11. A method according to claim 1, comprising shaping said bumper bar from steel having carbon content in a range of from 0.12 to 0.17 percent and in the hardening of the body effecting a yield strength of about 120,000 psi.

12. A method according to claim 1, including supporting said bar between refractory riser vanes in a fixturing die assembly and clamping said end portions between non-heating die surfaces in the assembly, heating said body and flanges to hardening temperature while continuously holding the bar between said risers and said end portion clamping surfaces, and then quenching.

13. A method of making a bumper bar of a length to be mounted protectively across an end of an automotive vehicle, comprising:
    shaping a suitable length of easily workable steel into desired bumper bar profile with an elongated body portion and spaced apart portions in the form of top and bottom flanges along said body portion and opposite end portions extending angularly from the body portion;

heat and quench hardening said body portion throughout its major extent and thereby providing it with a beam strength and yield strength to withstand bending stresses from repeated impact forces of a high order of magnitude without significant damage;

effecting heat and quench hardening along parts of the flanges spaced from the body portion while leaving limited areas of the material of the bar between the body portion and the hardened parts of the flanges substantially free from heat and quench hardening; and maintaining said end portions substantially free from heat and quench hardening and thereby serving with the limited areas between the body portion and the hardened parts of the flanges as warpage control areas and thereby maintaining the bumper bar free from detrimental warpage.

14. A method according to claim 13, including leaving a limited area of the body portion intermediate the body portion and one of said flanges substantially free from heat and quench hardening.

15. A method according to claim 13, including providing shoulders on the bar joining said portion and said end portions, and heat and quench hardening said shoulders.

16. A method according to claim 13, comprising shaping said bumper bar to provide a bumper reinforcement, and mounting a decorative bumper shell on and in concealing relation to said bumper bar.

17. A method according to claim 13, comprising shaping said bar from rolled steel having carbon content in a range of 0.12 to 0.17 percent.

18. A method according to claim 13, including effecting a yield strength in said hardened areas of about 120,000 psi.

19. A method according to claim 13, comprising induction heating those portions of the bar to be hardened while maintaining the bar fixtured, releasing the heated bar, and quenching the heated bar.

20. A method according to claim 13, comprising induction heating the body portion from both front and back sides thereof, induction heating said flanges, and after the induction heating quenching the heated portions of the bar.

21. A method of making a bumper bar shaped into desired profile from easily workable steel and of a length to be mounted protectively across an end of an automotive vehicle, comprising:

gripping the bar at places to be left unhardened to prevent detrimental warpage distortion;

heating a portion of the bar to hardening temperature;

sequentially after heating quenching the heated portion of the bar; and continuously maintaining the warpage distortion preventing portions of the bar gripped during heating and quenching.

22. A method of making a bumper bar of a length to be mounted protectively across an end of an automotive vehicle, comprising:

shaping a suitable length of easily workable steel into desired bumper bar profile with an elongated body portion and spaced apart portions in the form of top and bottom flanges along said body portion extending angularly from the body portion;

applying hardening heat to one face of said body portion along spaced longitudinal bands;

applying hardening heat to spaced longitudinal bands along the opposite face of the body and complementary to the bands along said one face of the body so that the body is uniformly heated throughout a substantial width thereof;

applying hardening heat along said flanges and spaced from said body so as to leave areas of the flanges contiguous to the body free from hardening heat; and quenching the bar.

23. Apparatus for selectively hardening a bumper bar shaped into desired profile from easily workable steel and of a length to be mounted protectively across an end of an automotive vehicle and having a horizontally elongated body portion and spaced apart integral upper and lower flanges of substantial width extending freely and angularly from the body portion, and opposite end portions turned angularly away from the body portion in the same direction as said flanges, the apparatus comprising:

complementary separable fixturing dies for receiving the bumper bar therebetween;

said dies having opposed clamping surfaces for engaging said end portions of the bar therebetween; and means for heating the body portion of the bar to hardening heat while said end portions are continuously clamped between said surfaces.

24. Apparatus according to claim 23, wherein said heating means comprise induction coils, and transit vane blocks on the dies supporting the induction coils.

25. Apparatus according to claim 23, including quenching fluid header and port means in one of said dies.

26. Apparatus according to claim 23, wherein said dies are mounted for relative separating and closing movement in horizontal direction.

27. Apparatus according to claim 23, including actuating means and electrical control means operative to effect cyclical continuous sequential operation of said dies to move them from an open condition into closing relation to engage the bar therebetween, then to effect said heating, and then to effect opening of the dies for removal of the bar.

28. Apparatus for selectively hardening a bumper bar shaped into desired profile from easily workable steel and of a length to be mounted protectively across an end of an automotive vehicle, comprising:

separable die members for gripping firmly therebetween portions of the bar to remain unhardened to prevent detrimental warpage;

means for heating a portion of the bar to hardening heat;

means for quenching the heated portion of the bar; and means for effecting operation of the heating and quenching means sequentially while warpage preventing portions of the bar are continuously gripped between the die members during heating and quenching.

29. Apparatus for making a bumper bar of a length to be mounted protectively across an end of an automotive vehicle and shaped from a suitable length of easily workable steel into desired bumper profile with an elongated body portion and spaced apart portions in the form of top and bottom flanges along said body portion and extending angularly from the body portion, the apparatus comprising:

means for applying hardening heat to one face of the body portion along spaced longitudinal bands;

means for applying heat to spaced longitudinal bands along the opposite face of the body portion and complementary to the bands along said one face of the body portion so that the body portion is uniformly heated throughout a substantial width thereof; and means for applying hardening heat along said flanges and spaced from said body portion so as to leave areas of the flanges contiguous to the body portion free from hardening heat;

whereafter the bar is adapted to be quenched for hardening of said body portion and the heated portions of the flanges.

* * * * *